United States Patent
Kommula et al.

(10) Patent No.: US 8,024,441 B2
(45) Date of Patent: Sep. 20, 2011

(54) GLOBAL SERVER LOAD BALANCING

(75) Inventors: Sunanda Lakshmi Kommula, San Jose, CA (US); Ivy Pei-Shan Hsu, Pleasanton, CA (US); Rajkumar Jalan, Saratoga, CA (US); David Chun Ying Cheung, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 302 days.

(21) Appl. No.: 11/707,697

(22) Filed: Feb. 16, 2007

(65) Prior Publication Data

US 2010/0082787 A1 Apr. 1, 2010

Related U.S. Application Data

(63) Continuation of application No. 10/206,580, filed on Jul. 25, 2002, now Pat. No. 7,254,626, which is a continuation-in-part of application No. 09/670,487, filed on Sep. 26, 2000, now Pat. No. 7,454,500.

(51) Int. Cl.
*G06F 15/173* (2006.01)

(52) U.S. Cl. ........................................ 709/223; 709/224

(58) Field of Classification Search .......... 709/217–219, 709/223, 224
See application file for complete search history.

(56) References Cited

U.S. PATENT DOCUMENTS

| | | | |
|---|---|---|---|
| 5,031,094 A | 7/1991 | Toegel et al. | 364/200 |
| 5,359,593 A | 10/1994 | Derby et al. | 370/17 |
| 5,867,706 A | 2/1999 | Martin et al. | |
| 5,948,061 A | 9/1999 | Merriman et al. | 709/219 |
| 5,951,634 A | 9/1999 | Sitbon et al. | 709/105 |
| 6,006,269 A | 12/1999 | Phaal | |
| 6,006,333 A | 12/1999 | Nielsen | |
| 6,078,956 A | 6/2000 | Bryant et al. | |
| 6,092,178 A | 7/2000 | Jindal et al. | 712/27 |
| 6,112,239 A | 8/2000 | Kenner et al. | 709/224 |
| 6,115,752 A | 9/2000 | Chauhan | 709/241 |
| 6,119,143 A * | 9/2000 | Dias et al. | 709/201 |
| 6,128,279 A | 10/2000 | O'Neil et al. | 370/229 |
| 6,128,642 A | 10/2000 | Doraswamy et al. | 709/201 |
| 6,148,410 A | 11/2000 | Baskey et al. | |
| 6,157,649 A | 12/2000 | Peirce et al. | |
| 6,167,445 A | 12/2000 | Gai et al. | |
| 6,167,446 A | 12/2000 | Lister et al. | 709/223 |
| 6,178,160 B1 | 1/2001 | Bolton et al. | |
| 6,182,139 B1 | 1/2001 | Brendel | 709/226 |

(Continued)

OTHER PUBLICATIONS

Albitz, P., et al., "DNS and BIND in a Nutshell," O'Reilly & Associates, Sebastopol, CA, 1992, pp. 214-215.

(Continued)

*Primary Examiner* — Hussein A. Elchanti
(74) *Attorney, Agent, or Firm* — Schwabe, Williamson & Wyatt, P.C.

(57) ABSTRACT

A global server load-balancing (GSLB) switch serves as a proxy to an authoritative DNS and communicates with numerous site switches that are coupled to host servers serving specific applications. The GSLB switch receives from site switches operational information regarding host servers within the site switches neighborhood. When a client program requests a resolution of a host name, the GSLB switch, acting as a proxy of an authoritative DNS, returns one or more ordered IP addresses for the host name. The IP addresses are ordered using metrics that include the information collected from the site switches. In one instance, the GSLB switch places the address that is deemed "best" at the top of the list.

33 Claims, 5 Drawing Sheets

U.S. PATENT DOCUMENTS

| | | | |
|---|---|---|---|
| 6,195,691 B1 | 2/2001 | Brown | |
| 6,233,604 B1 | 5/2001 | Van Horne et al. | 709/203 |
| 6,260,070 B1 | 7/2001 | Shah | |
| 6,262,976 B1 | 7/2001 | McNamara | |
| 6,286,039 B1 | 9/2001 | Van Horne et al. | 709/221 |
| 6,286,047 B1 | 9/2001 | Ramanathan et al. | 709/224 |
| 6,304,913 B1 | 10/2001 | Rune | |
| 6,317,775 B1 | 11/2001 | Coile et al. | |
| 6,324,177 B1 * | 11/2001 | Howes et al. | 370/389 |
| 6,324,580 B1 | 11/2001 | Jindal et al. | 709/228 |
| 6,327,622 B1 * | 12/2001 | Jindal et al. | 709/228 |
| 6,336,137 B1 | 1/2002 | Lee et al. | |
| 6,381,627 B1 | 4/2002 | Kwan et al. | 709/201 |
| 6,389,462 B1 | 5/2002 | Cohen et al. | 709/218 |
| 6,393,473 B1 | 5/2002 | Chu | |
| 6,405,252 B1 * | 6/2002 | Gupta et al. | 709/224 |
| 6,411,998 B1 | 6/2002 | Bryant et al. | |
| 6,427,170 B1 | 7/2002 | Sitaraman et al. | 709/226 |
| 6,434,118 B1 | 8/2002 | Kirschenbaum | |
| 6,438,652 B1 | 8/2002 | Jordan et al. | 711/120 |
| 6,446,121 B1 | 9/2002 | Shah et al. | |
| 6,449,657 B2 | 9/2002 | Stanbach, Jr. et al. | 709/245 |
| 6,470,389 B1 | 10/2002 | Chung et al. | 709/227 |
| 6,473,802 B2 | 10/2002 | Masters | |
| 6,480,508 B1 | 11/2002 | Mwikalo et al. | 370/475 |
| 6,487,555 B1 | 11/2002 | Bharat | |
| 6,490,624 B1 | 12/2002 | Sampson et al. | |
| 6,513,061 B1 | 1/2003 | Ebata et al. | |
| 6,542,964 B1 * | 4/2003 | Scharber | 711/122 |
| 6,549,944 B1 | 4/2003 | Weinberg et al. | 709/224 |
| 6,578,066 B1 | 6/2003 | Logan et al. | 709/105 |
| 6,578,077 B1 * | 6/2003 | Rakoshitz et al. | 709/224 |
| 6,606,643 B1 * | 8/2003 | Emens et al. | 709/203 |
| 6,611,861 B1 | 8/2003 | Schairer et al. | |
| 6,647,009 B1 | 11/2003 | Kubota et al. | |
| 6,665,702 B1 | 12/2003 | Zisapel et al. | |
| 6,681,232 B1 | 1/2004 | Sistanizadeh et al. | 707/104.1 |
| 6,681,323 B1 | 1/2004 | Fontanesi et al. | 713/1 |
| 6,691,165 B1 | 2/2004 | Bruck et al. | |
| 6,725,253 B1 * | 4/2004 | Okano et al. | 709/203 |
| 6,745,241 B1 | 6/2004 | French et al. | |
| 6,748,416 B2 | 6/2004 | Carpenter et al. | |
| 6,754,699 B2 * | 6/2004 | Swildens et al. | 709/217 |
| 6,760,775 B1 | 7/2004 | Anerousis | |
| 6,772,211 B2 | 8/2004 | Lu et al. | |
| 6,779,017 B1 | 8/2004 | Lamberton et al. | |
| 6,789,125 B1 | 9/2004 | Aviani et al. | 709/238 |
| 6,795,434 B1 | 9/2004 | Kumar et al. | |
| 6,795,860 B1 | 9/2004 | Shah | |
| 6,801,949 B1 | 10/2004 | Bruck et al. | |
| 6,810,411 B1 | 10/2004 | Coughlin et al. | |
| 6,826,198 B2 | 11/2004 | Turina et al. | |
| 6,839,700 B2 | 1/2005 | Doyle et al. | |
| 6,850,984 B1 | 2/2005 | Kalkunte et al. | 709/229 |
| 6,874,152 B2 | 3/2005 | Vermeire et al. | |
| 6,879,995 B1 | 4/2005 | Chinta et al. | 709/204 |
| 6,880,000 B1 | 4/2005 | Tominaga et al. | |
| 6,883,028 B1 | 4/2005 | Johnson et al. | |
| 6,898,633 B1 | 5/2005 | Lyndersay et al. | 709/226 |
| 6,901,081 B1 | 5/2005 | Ludwig | |
| 6,920,498 B1 | 7/2005 | Gourlay et al. | |
| 6,928,485 B1 | 8/2005 | Krishnamurthy et al. | |
| 6,950,848 B1 | 9/2005 | Yousefi'zadeh | |
| 6,963,914 B1 | 11/2005 | Breitbart et al. | 709/226 |
| 6,963,917 B1 | 11/2005 | Callis et al. | 709/227 |
| 6,985,956 B2 | 1/2006 | Luke et al. | |
| 6,987,763 B2 | 1/2006 | Rochberger et al. | 370/389 |
| 6,996,615 B1 | 2/2006 | McGuire | |
| 6,996,616 B1 | 2/2006 | Leighton et al. | |
| 7,000,007 B1 | 2/2006 | Valenti | 709/219 |
| 7,020,698 B2 | 3/2006 | Andrews et al. | 709/223 |
| 7,020,714 B2 | 3/2006 | Kalyanaraman et al. | |
| 7,028,083 B2 | 4/2006 | Levine et al. | |
| 7,032,010 B1 | 4/2006 | Swildens et al. | 709/219 |
| 7,032,031 B2 | 4/2006 | Jungck et al. | |
| 7,036,039 B2 | 4/2006 | Holland | |
| 7,047,300 B1 | 5/2006 | Oehrke et al. | |
| 7,058,706 B1 | 6/2006 | Iyer et al. | |
| 7,058,717 B2 | 6/2006 | Chao et al. | |
| 7,062,642 B1 | 6/2006 | Langrind et al. | |
| 7,082,102 B1 | 7/2006 | Wright | |
| 7,086,061 B1 | 8/2006 | Joshi et al. | 718/105 |
| 7,089,293 B2 | 8/2006 | Grosner et al. | |
| 7,099,915 B1 | 8/2006 | Tenereillo et al. | |
| 7,114,008 B2 | 9/2006 | Jungck et al. | |
| 7,117,269 B2 * | 10/2006 | Lu et al. | 709/238 |
| 7,117,530 B1 | 10/2006 | Lin | |
| 7,124,188 B2 * | 10/2006 | Mangipudi et al. | 709/226 |
| 7,127,713 B2 | 10/2006 | Davis et al. | |
| 7,136,932 B1 | 11/2006 | Schneider | |
| 7,139,242 B2 | 11/2006 | Bays | |
| 7,177,933 B2 | 2/2007 | Foth | |
| 7,185,052 B2 | 2/2007 | Day | |
| 7,197,547 B1 | 3/2007 | Miller et al. | |
| 7,206,806 B2 | 4/2007 | Pineau | |
| 7,213,068 B1 | 5/2007 | Kohli et al. | |
| 7,225,272 B2 | 5/2007 | Kelley et al. | |
| 7,240,015 B1 | 7/2007 | Karmouch et al. | |
| 7,240,100 B1 | 7/2007 | Wein et al. | |
| 7,254,626 B1 | 8/2007 | Kommula et al. | |
| 7,257,642 B1 | 8/2007 | Bridger et al. | |
| 7,260,645 B2 | 8/2007 | Bays | |
| 7,277,954 B1 | 10/2007 | Stewart et al. | |
| 7,296,088 B1 | 11/2007 | Padmanabhan et al. | |
| 7,321,926 B1 | 1/2008 | Zhang et al. | |
| 7,330,908 B2 | 2/2008 | Jungck | |
| 7,383,288 B2 | 6/2008 | Miloushev et al. | |
| 7,423,977 B1 | 9/2008 | Joshi et al. | |
| 7,441,045 B2 | 10/2008 | Skene et al. | |
| 7,454,500 B1 | 11/2008 | Hsu et al. | |
| 7,496,651 B1 | 2/2009 | Joshi | |
| 7,523,181 B2 | 4/2009 | Swildens et al. | |
| 7,573,886 B1 | 8/2009 | Ono | |
| 7,574,508 B1 | 8/2009 | Kommula | |
| 7,581,009 B1 | 8/2009 | Hsu et al. | |
| 7,584,262 B1 | 9/2009 | Wang et al. | |
| 7,584,301 B1 | 9/2009 | Joshi | |
| 7,657,629 B1 | 2/2010 | Kommula | |
| 7,676,576 B1 | 3/2010 | Kommula | |
| 7,756,965 B2 | 7/2010 | Joshi | |
| 7,840,678 B2 | 11/2010 | Joshi | |
| 7,885,188 B2 | 2/2011 | Joshi | |
| 7,899,899 B2 | 3/2011 | Joshi | |
| 7,949,757 B2 | 5/2011 | Joshi | |
| 2001/0049741 A1 | 12/2001 | Skene et al. | |
| 2001/0052016 A1 | 12/2001 | Skene et al. | 709/226 |
| 2002/0026551 A1 | 2/2002 | Kamimaki et al. | 710/260 |
| 2002/0038360 A1 | 3/2002 | Andrews et al. | 709/223 |
| 2002/0055939 A1 | 5/2002 | Nardone et al. | |
| 2002/0059170 A1 | 5/2002 | Vange | |
| 2002/0059464 A1 | 5/2002 | Hata et al. | |
| 2002/0062372 A1 | 5/2002 | Hong et al. | 709/225 |
| 2002/0078233 A1 | 6/2002 | Biliris et al. | 709/238 |
| 2002/0087722 A1 | 7/2002 | Datta et al. | |
| 2002/0091840 A1 | 7/2002 | Pulier et al. | 709/228 |
| 2002/0112036 A1 | 8/2002 | Bohannon et al. | 709/220 |
| 2002/0120743 A1 | 8/2002 | Shabtay et al. | 709/226 |
| 2002/0120763 A1 | 8/2002 | Miloushev et al. | |
| 2002/0124096 A1 | 9/2002 | Loguinov et al. | |
| 2002/0133601 A1 | 9/2002 | Kennamer et al. | |
| 2002/0150048 A1 | 10/2002 | Ha et al. | |
| 2002/0154600 A1 | 10/2002 | Ido et al. | |
| 2002/0188862 A1 | 12/2002 | Trethewey et al. | 713/201 |
| 2002/0194324 A1 | 12/2002 | Guha | |
| 2002/0194335 A1 | 12/2002 | Maynard | 709/225 |
| 2003/0018796 A1 | 1/2003 | Chou et al. | |
| 2003/0031185 A1 | 2/2003 | Kikuchi et al. | |
| 2003/0035430 A1 | 2/2003 | Islam et al. | |
| 2003/0065711 A1 | 4/2003 | Acharya et al. | 709/203 |
| 2003/0065763 A1 | 4/2003 | Swildens et al. | 709/224 |
| 2003/0105797 A1 | 6/2003 | Dolev et al. | 709/105 |
| 2003/0115283 A1 | 6/2003 | Barbir et al. | |
| 2003/0135509 A1 | 7/2003 | Davis et al. | 707/100 |
| 2003/0154239 A1 | 8/2003 | Davis et al. | 709/201 |
| 2003/0210686 A1 | 11/2003 | Terrell et al. | 370/389 |
| 2003/0210694 A1 | 11/2003 | Jayaraman et al. | 370/392 |
| 2003/0229697 A1 | 12/2003 | Borella | |

| | | | |
|---|---|---|---|
| 2004/0019680 A1 | 1/2004 | Chao et al. | |
| 2004/0024872 A1 | 2/2004 | Kelley et al. | 709/225 |
| 2004/0039847 A1 | 2/2004 | Persson et al. | |
| 2004/0064577 A1 | 4/2004 | Dahlin et al. | |
| 2004/0194102 A1 | 9/2004 | Neerdaels | |
| 2004/0249939 A1 | 12/2004 | Amini et al. | |
| 2004/0249971 A1 | 12/2004 | Klinker | |
| 2004/0259565 A1 | 12/2004 | Lucidarme | |
| 2005/0002410 A1 | 1/2005 | Chao et al. | |
| 2005/0021883 A1 | 1/2005 | Shishizuka et al. | 710/20 |
| 2005/0033858 A1 | 2/2005 | Swildens et al. | 709/232 |
| 2005/0086295 A1 | 4/2005 | Cunningham et al. | 709/203 |
| 2005/0149531 A1 | 7/2005 | Srivastava | 707/10 |
| 2005/0169180 A1 | 8/2005 | Ludwig | |
| 2005/0286416 A1 | 12/2005 | Shimonishi et al. | |
| 2006/0020715 A1 | 1/2006 | Jungck | |
| 2006/0036743 A1 | 2/2006 | Deng et al. | |
| 2006/0167894 A1 | 7/2006 | Wunner | |
| 2006/0209689 A1 | 9/2006 | Nakano et al. | |
| 2007/0168448 A1 | 7/2007 | Garbow et al. | |
| 2007/0168547 A1 | 7/2007 | Krywaniuk | |
| 2007/0180113 A1 | 8/2007 | Van Bemmel | |
| 2008/0037420 A1 | 2/2008 | Tang | |
| 2008/0123597 A1 | 5/2008 | Arbol et al. | |
| 2008/0144784 A1 | 6/2008 | Limberg | |
| 2008/0147866 A1 | 6/2008 | Stolorz et al. | |
| 2010/0010991 A1 | 1/2010 | Joshi | |
| 2010/0011120 A1 | 1/2010 | Kommula | |
| 2010/0153558 A1 | 6/2010 | Kommula | |
| 2010/0223621 A1 | 9/2010 | Joshi | |
| 2010/0293296 A1 | 11/2010 | Hsu et al. | |
| 2010/0299427 A1 | 11/2010 | Joshi | |
| 2011/0099261 A1 | 4/2011 | Joshi | |
| 2011/0122771 A1 | 5/2011 | Joshi | |

OTHER PUBLICATIONS

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.
Alteon WebSystems, Inc., "Enhancing Web User Experience with Global Server Load Balancing," Jun. 1999, 8 pages.
Bestavros, Azer, "WWW Traffic Reduction and Load Balancing through Server-Based Caching," *IEEE Concurrency*, pp. 56-67, Jan.-Mar. 1997.
Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.
Nortel Networks, "Alteon Personal Content Director," © 2001, can be retrieved from http://www.nortelnetworks.com/personalinternet, 4 pages.
IBM Corp., *IBM WebSphere Performance Pack: Load Balancing with IBM SecureWay Network Dispatcher*, First Edition, Chapters 1, 2, 4, and 8, Oct. 1999.
IBM Corp., *Secure Way® Network Dispatcher: User's Guide—Version 2.1 for AIX, Solaris, and Windows NT*, Third Edition, Chapters 3, 4, 9, 10, 11, and Appendices C & E, Mar. 1999.
Paul, Arindam et al., "Balancing Web Server Load for Adaptable Video Distribution," *IEEE* pp. 469-476, 2000.
Yerxa, G., "ACElerate on Fast Track for Load-Balancing," Mar. 8, 1999, retrieved Nov. 5, 2002, from http://www.networkcomputing.com/1005/1005sp2.html, pp. 1-4.
U.S. Appl. No. 09/670,487, filed Sep. 26, 2000, Hsu et al.
U.S. Appl. No. 10/206,580, filed Jul. 25, 2002, Kommula et al.
U.S. Appl. No. 10/214,921, filed Aug. 7, 2002, Kommula.
U.S. Appl. No. 10/305,823, filed Nov. 27, 2002, Joshi et al.
U.S. Appl. No. 10/377,364, filed Feb. 28, 2003, Kommula.
U.S. Appl. No. 10/376,903, filed Feb. 28, 2003, Kommula.
U.S. Appl. No. 10/674,627, filed Sep. 29, 2003, Joshi.
U.S. Appl. No. 10/839,919, filed May 6, 2004, Joshi.
U.S. Appl. No. 10/840,496, filed May 6, 2004, Joshi.
U.S. Appl. No. 10/924,552, filed Aug. 23, 2004, Joshi.
U.S. Appl. No. 11/429,177, filed May 5, 2006, Joshi et al.
AlteonWebSystems, "PCD White Paper," *AlteonWebSystems*, pp. 1-8, Mar. 2001.
Cardellini, V., et al., "Dynamic Load Balancing on Web-server Systems," *IEEE Internet Computing*, 3(3):28-39, May-Jun. 1999.
Foundry Networks, Inc., "Server Load Balancing in Today's Web-enabled Enterprises," *White Paper*, pp. 1-10, Apr. 2002.
Genova, Z., et al., "Challenges in URL Switching for Implementing Globally Distributed Web Sites," *IEEE*, pp. 89-94, 2000.
Genova, Z., et al., "Challenges to URL Switching for Implementing Globally Distributed Web Sites," Department of Computer Science and Engineering, University of South Florida, pp. 1-9, Aug. 11, 2000.
Cisco Document, "Configuring the CSS Domain Name Service,", posted on Dec. 2000, Cisco Systems Inc., http://www.ciscosystems.com, pp. 1-13.
Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.
Joshi, "Smoothing Algorithm for Round Trip Time (RTT) Measurements," assigned U.S. Appl. No. 12/177,021, filed Jul. 21, 2008.
U.S. Appl. No. 11/741,480, filed Apr. 27, 2007, Hsu et al.
U.S. Appl. No. 12/272,618, filed Nov. 17, 2008, Hsu et al.
U.S. Appl. No. 12/353,701, filed Jan. 14, 2009, Joshi.
Doeringer et al., "Routing on Longest-Matching Prefixes," IEEE/ACM Transactions on Networking, vol. 4, No. 1, Feb. 1996, pp. 86-97.
Prajakta S. Joshi, "Host-Level Policies for Global Server Load Balancing," U.S. Appl. No. 12/506,130, filed Jul. 20, 2009.
Sunanda Lakshmi Kommula, "Canonical Name (CNAME) Handling for Global Server Load Balancing," U.S. Appl. No. 12/506,137, filed Jul. 20, 2009.
Hsu et al., "Global Server Load Balancing," U.S. Appl. No. 12/496,560, filed Jul. 1, 2009.
Office Action, issued in U.S. Appl. No. 10/211,822, mailed Aug. 19, 2005.
Notice of Allowance, issued in U.S. Appl. No. 10/211,822, mailed Mar. 7, 2006.
Office Action, issued in U.S. Appl. No. 10/377,364, mailed Sep. 22, 2006.
Office Action, issued in U.S. Appl. No. 10/377,364, mailed Mar. 26, 2007.
Office Action, issued in U.S. Appl. No. 10/377,364, mailed Sep. 4, 2007.
Office Action, issued in U.S. Appl. No. 10/377,364, mailed Apr. 9, 2008.
Office Action, issued in U.S. Appl. No. 10/377,364, mailed Nov. 24, 2008.
Office Action, issued in U.S. Appl. No. 10/377,364, mailed Aug. 31, 2009.
Advisory Action, issued in U.S. Appl. No. 10/377,364, mailed Nov. 23, 2009.
Office Action, issued in U.S. Appl. No. 10/206,580, mailed Aug. 15, 2005.
Office Action, issued in U.S. Appl. No. 10/206,580, mailed Mar. 9, 2006.
Advisory Action, issued in U.S. Appl. No. 10/206,580, mailed Jun. 6, 2006.
Office Action, issued in U.S. Appl. No. 10/206,580, mailed Jul. 12, 2006.
Notice of Allowance, issued in U.S. Appl. No. 10/206,580, mailed Jan. 11, 2007.
Office Action, issued in U.S. Appl. No. 10/376,903, mailed Jul. 17, 2006.
Office Action, issued in U.S. Appl. No. 10/376,903, mailed Jan. 12, 2007.
Office Action, issued in U.S. Appl. No. 10/376,903, mailed Jun. 5, 2007.
Office Action, issued in U.S. Appl. No. 10/376,903, mailed Feb. 20, 2008.
Office Action, issued in U.S. Appl. No. 10/376,903, mailed Oct. 16, 2008.
Office Action, issued in U.S. Appl. No. 10/376,903, mailed Mar. 4, 2009.

Office Action, issued in U.S. Appl. No. 10/214,921, mailed Feb. 7, 2006.
Office Action, issued in U.S. Appl. No. 10/214,921, mailed Aug. 9, 2006.
Advisory Action, issued in U.S. Appl. No. 10/214,921, mailed Sep. 21, 2006.
Office Action, issued in U.S. Appl. No. 10/214,921, mailed Dec. 7, 2006.
Office Action, issued in U.S. Appl. No. 10/214,921, mailed Aug. 13, 2007.
Office Action, issued in U.S. Appl. No. 10/214,921, mailed Nov. 15, 2007.
Office Action, issued in U.S. Appl. No. 10/214,921, mailed Jun. 12, 2008.
Office Action, issued in U.S. Appl. No. 10/214,921, mailed Oct. 6, 2008.
Notice of Allowance, issued in U.S. Appl. No. 10/214,921, mailed Apr. 3, 2009.
Office Action, issued in U.S. Appl. No. 10/305,823, mailed Jan. 12, 2006.
Office Action, issued in U.S. Appl. No. 10/305,823, mailed Jul. 3, 2006.
Office Action, issued in U.S. Appl. No. 10/305,823, mailed Jan. 3, 2007.
Office Action, issued in U.S. Appl. No. 10/305,823, mailed Sep. 10, 2007.
Office Action, issued in U.S. Appl. No. 10/305,823, mailed Mar. 24, 2008.
Advisory Action, issued in U.S. Appl. No. 10/305,823, mailed Jul. 9, 2008.
Examiner's Answer, issued in U.S. Appl. No. 10/305,823, mailed Mar. 4, 2009.
Supplemental Examiner's Answer, issued in U.S. Appl. No. 10/305,823, mailed Apr. 13, 2009.
Office Action, issued in U.S. Appl. No. 10/674,627, mailed Jun. 5, 2006.
Office Action, issued in U.S. Appl. No. 10/674,627, mailed Nov. 3, 2006.
Office Action, issued in U.S. Appl. No. 10/674,627, mailed Jul. 30, 2007.
Office Action, issued in U.S. Appl. No. 10/674,627, mailed Apr. 11, 2008.
Office Action, issued in U.S. Appl. No. 10/674,627, mailed Dec. 23, 2008.
Office Action, issued in U.S. Appl. No. 10/674,627, mailed Aug. 3, 2009.
Advisory Action, issued in U.S. Appl. No. 10/674,627, mailed Oct. 16, 2009.
Notice of Allowance, issued in U.S. Appl. No. 10/839,919, mailed Mar. 5, 2008.
Office Action, issued in U.S. Appl. No. 10/839,919, mailed Jun. 18, 2008.
Office Action, issued in U.S. Appl. No. 10/839,919, mailed Dec. 9, 2008.
Notice of Allowance, issued in U.S. Appl. No. 10/839,919, mailed May 14, 2009.
Office Action, issued in U.S. Appl. No. 10/840,496, mailed Oct. 18, 2007.
Office Action, issued in U.S. Appl. No. 10/840,496, mailed Aug. 1, 2008.
Notice of Allowance, issued in U.S. Appl. No. 10/840,496, mailed Oct. 15, 2008.
Office Action, issued in U.S. Appl. No. 12/353,701, mailed Nov. 4, 2009.
Office Action, issued in U.S. Appl. No. 10/924,552, mailed Feb. 27, 2008.
Notice of Allowance, issued in U.S. Appl. No. 10/924,552, mailed May 30, 2008.
Office Action, issued in U.S. Appl. No. 09/670,487, mailed Dec. 31, 2003.
Office Action, issued in U.S. Appl. No. 09/670,487, mailed Sep. 21, 2004.
Office Action, issued in U.S. Appl. No. 09/670,487, mailed Mar. 15, 2005.
Office Action, issued in U.S. Appl. No. 09/670,487, mailed Nov. 3, 2005.
Office Action, issued in U.S. Appl. No. 09/670,487, mailed May 3, 2006.
Office Action, issued in U.S. Appl. No. 09/670,487, mailed Nov. 17, 2006.
Office Action, issued in U.S. Appl. No. 09/670,487, mailed Oct. 30, 2007.
Office Action, issued in U.S. Appl. No. 09/670,487, mailed Jul. 22, 2008.
Notice of Allowance, issued in U.S. Appl. No. 09/670,487, mailed Sep. 18, 2008.
Office Action, issued in U.S. Appl. No. 11/741,480, mailed Nov. 27, 2007.
Office Action, issued in U.S. Appl. No. 11/741,480, mailed Apr. 29, 2008.
Office Action, issued in U.S. Appl. No. 11/741,480, mailed Oct. 31, 2008.
Notice of Allowance, issued in U.S. Appl. No. 11/741,480, mailed Apr. 10, 2009.
Non-Final Office Action, mailed on Sep. 29, 2009, for U.S. Appl. No. 12/272,618, 16 pages.
Notice of Allowance, mailed Jul. 6, 2007, for U.S. Appl. No. 10/206,580, 5 pages.
Notice of Allowance, mailed on Oct. 19, 2009, for U.S. Appl. No. 10/376,903, 4 pages.
Notice of Allowance, mailed on Aug. 19, 2010, for U.S. Appl. No. 10/674,627, 4 pages.
Civil Action 10-332, Complaint for Patent Infringement with Exhibits A-G, filed on Apr. 23, 2010, 131 pages.
Civil Action 10-332, Second Amended and Supplemental Complaint for Patent Infringement with Exhibits H-I, filed on Jul. 16, 2010, 41 pages.
Civil Action CV10-03443, Complaint for Declaratory Judgment with Exhibits A-I, filed on Aug. 6, 2010, 153 pages.
Notice of Allowance for U.S. Appl. No. 12/506,130, mailed on Oct. 12, 2010, 49 pages.
F5 Networks, Inc., "Keeping Up with Multi-Service Applications," A F5 Networks, Inc. White Paper Document, Jan. 2006, 8 pages, Seattle, WA.
Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.
F5 Networks, Inc., "Optimize Application Delivery Across Your Globally Distributed Data Centers," BIG-IP Global Traffic Manager Datasheet, 2009, 8 pages, Seattle WA.
Stalvig, P., "Disaster Recovery: Not Just Planning for the Worst," A F5 Networks, Inc. White Paper Document, 2008, 16 pages, F5 Networks, Inc., Seattle, WA.
Cisco Systems, Inc., "The Global Server Load Balancing Primer," A Cisco Systems, Inc. White Paper Document, 1992-2004, 20 pages, San Jose, CA.
Kommula, U.S. Appl. No. 12/787,779, filed May 26, 2010.
Notice of Allowance, issued in U.S. Appl. No. 10/377,364, mailed Jan. 12, 2010.
Notice of Allowance, issued in U.S. Appl. No. 12/353,701, mailed Apr. 9, 2010.
Office Action, issued in U.S. Appl. No. 12/177,021, mailed Jan. 29, 2010.
Office Action, issued in U.S. Appl. No. 12/272,618, mailed Feb. 4, 2010.
Non-Final Office Action for U.S. Appl. No. 12/635,371, mailed on Oct. 7, 2010, 44 pages.
Non-Final Office Action for U.S. Appl. No. 12/506,137, mailed on Oct. 7, 2010, 26 pages.
Devarapalli et al., U.S. Appl. No. 61/393,796, filed Oct. 15, 2010.
Devarapalli et al., U.S. Appl. No. 12/916,390, filed Oct. 29, 2010.
Joshi, U.S. Appl. No. 12/938,232, filed Nov. 2, 2010.
Network Working Group, Request for Comments (RFC) 4033, "DNS Security Introduction and Requirements," Mar. 2005, 22 pages.

Network Working Group, Request for Comments (RFC) 4034, "Resource Records for the DNS Security Extensions," Mar. 2005, 31 pages.

Network Working Group, Request for Comments (RFC) 4035, "Protocol Modifications for the DNS Security Extensions," Mar. 2005, 55 pages.

National Institute of Standards and Technology (NIST), "Secure Domain Name System (DNS) Deployment Guide," Special Publication 800-81, May 2006, 103 pages.

CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.

Meyer, Nathan et al., "F5 and Infoblox DNS Integrated Architecture: Offering a Complete Scalable, Secure DNS Solution," A F5 Networks, Inc. Technical Brief, 2010, 18 pages, Seattle, WA.

Silva, Peter, "DNSSEC: The Antidote to DNS Cache Poisoning and Other DNS Attacks," A F5 Networks, Inc. Technical Brief, 2009, 10 pages, Seattle, WA.

Wikimedia Foundation, Inc., "Domain Name Security Extensions," retrieved Oct. 22, 2010, from http://en.wikipedia.org/wiki/Domain_Name_System_Security_Extensions, 17 pages.

A10 Networks, Inc., "A10 Networks Announces Unique and Wide Ranging Customer-Driven Functionality for AX Series Application Delivery Controllers," News Release, Oct. 18, 2010, from http://www.a10networks.com/news/2010/101018-AX_Series_2.6.php, 2 pages.

Civil Action 10-332, Report on the Filing or Determination of an Action Regarding a Patent or Trademark, filed on Aug. 5, 2010, 2 pages.

Civil Action 10-332, Notice of Voluntary Dismissal Without Prejudice, filed on Aug. 5, 2010, 2 pages.

Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.

Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.

Non-Final Office Action for U.S. Appl. No. 12/496,560, mailed on Sep. 17, 2010, 27 pages.

Final Office Action, mailed Aug. 12, 2010, for U.S. Appl. No. 12/177,021, 6 pages.

Joshi, U.S. Appl. No. 13/008,321, filed Jan. 18, 2011, 36 pages.

Joshi, U.S. Appl. No. 13/023,292, filed Feb. 8, 2011, 30 pages.

Final Office Action for U.S. Appl. No. 12/496,560, mailed on Jan. 28, 2011, 10 pages.

Final Office Action for U.S. Appl. No. 12/272,618, mailed on Nov. 26, 2010, 19 pages.

Notice of Allowance for U.S. Appl. No. 12/787,779, mailed Dec. 20, 2010, 45 pages.

Notice of Allowance for U.S. Appl. No. 12/787,779, mailed Jan. 12, 2011, 48 pages.

Notice of Allowance for U.S. Appl. No. 12/177,021, mailed Dec. 10, 2010, 20 pages.

Joshi, U.S. Appl. No. 13/101,398, filed May 5, 2011, 28 pages.

Request for Reexamination of U.S. Patent No. 7,454,500, filed Jun. 27, 2011, 29 pages.

Request for Reexamination of U.S. Patent No. 7,581,009, filed Jun. 27, 2011, 58 pages.

Notice of Allowance for U.S. Appl. No. 12/496,560, mailed on May 16, 2011, 11 pages.

Non-Final Office Action for U.S. Appl. No. 12/272,618, mailed on Jun. 14, 2011, 13 pages.

Non-Final Office Action for U.S. Appl. No. 11/429,177, mailed May 19, 2011, 87 pages.

Request for Reexamination of U.S. Patent No. 7,657,629, filed Jun. 27, 2011, 36 pages.

Final Office Action for U.S. Appl. No. 12/635,371, mailed on Mar. 16, 2011, 7 pages.

Non-Final Office Action for U.S. Appl. No. 12/635,371, mailed on Jun. 8, 2011, 9 pages.

Request for Reexamination of U.S. Patent No. 7,574,508, filed Jun. 27, 2011, 21 pages.

Request for Reexamination of U.S. Patent No. 7,584,301, filed Jun. 27, 2011, 36 pages.

Request for Reexamination of U.S. Patent No. 7,840,678, filed Jun. 27, 2011, 25 pages.

Notice of Allowance for U.S. Appl. No. 12/938,232, mailed on Apr. 7, 2011, 51 pages.

Request for Reexamination of U.S. Patent No. 7,756,965, filed Jun. 27, 2011, 38 pages.

Request for Reexamination of U.S. Patent No. 7,899,899, filed Jun. 27, 2011, 24 pages.

Non-Final Office Action for U.S. Appl. No. 13/023,292, mailed Jul. 8, 2011, 6 pages.

Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.

Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 29, 2011, 42 pages.

Civil Action CV10-03428, Answer to Third Amended Complaint, Affirmative Defenses, and Counterclaims, filed on May 16, 2011, 40 pages.

Civil Action CV10-03428, Answer to Defendant A10 Networks, Inc.'s Counterclaims, and Counterclaim, filed on May 27, 2011, 12 pages.

Delgadillo, K., "Cisco Distributed Director," Cisco White Paper, 1999, 19 pages.

Table of Contents for 2nd Conference on Telecommunications (ConfTele'99), Apr. 15-16, 1999, 9 pages.

Bernardo, L. et al., "Scalability Issues in Telecommunication Services," in Proceedings of 2nd Conference on Telecommunications (ConfTele'99), Apr. 15-16, 1999, pp. 409-413.

Lin, "VPN Tunnel Balancer," U.S. Appl. No. 60/169,502, filed Dec. 7, 1999, 7 pages.

Cisco Systems, Inc., "Cisco LocalDirector Version 1.6.3 Release Notes," Oct. 1997, 52 pages, San Jose, CA.

Foundry Networks, Inc., "Foundry ServerIron Installation and Configuration Guide," May 2000, Table of Contents through Chapter 5, 225 pages.

Dell Computer Corporation, "3-DNS Reference Guide, Version 4.2," 2002, 261 pages.

Decision on Appeal for U.S. Appl. No. 10/305,823, mailed on Jul. 11, 2011, 10 pages.

Foundry Networks, Inc., "Foundry ServerIron Installation and Configuration Guide," May 2000, Chapter 6 through Chapter 10, 207 pages.

Foundry Networks, Inc., "Foundry ServerIron Installation and Configuration Guide," May 2000, Chapter 11 through Appendix C, 352 pages.

Order Granting Request for Reexamination of U.S. Patent No. 7,657,629, mailed Jul. 30, 2011, Reexamination Control No. 90/011,766, 10 pages.

Order Granting Request for Reexamination of U.S. Patent No. 7,574,508, mailed Jul. 22, 2011, Reexamination Control No. 90/011,764, 15 pages.

Order Granting Request for Reexamination of U.S. Patent No. 7,584,301, mailed Aug. 8, 2011, Reexamination Control No. 90/011,765, 10 pages.

Order Granting Request for Reexamination of U.S. Patent No. 7,840,678, mailed Jul. 29, 2011, Reexamination Control No. 90/011,763, 10 pages.

* cited by examiner

GLOBAL SERVER LOAD BALANCING

CROSS-REFERENCE TO RELATED APPLICATIONS

The present application is a continuation that claims the benefit under 35 U.S.C. §120 of U.S. patent application Ser. No. 10/206,580, entitled "GLOBAL SERVER LOAD BALANCING," filed Jul. 25, 2002, which is a continuation-in-part of U.S. application Ser. No. 09/670,487, entitled "GLOBAL SERVER LOAD BALANCING," filed Sep. 26, 2000, both of which are assigned to the same assignee as the present application, and which are incorporated herein by reference their entireties.

BACKGROUND OF THE INVENTION

1. Field of the Invention

The disclosure invention relates generally to load balancing among servers. More particularly but not exclusively, the present disclosure relates to achieving load balancing by, in response to resolving a DNS query by a client, providing the address of a server that is expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS does not detect a server that is down. Consequently, the authoritative DNS server continues to return a disabled host server's IP address until an external agent updates the authoritative DNS server's resource records. Second, when providing its list of IP addresses, the authoritative DNS sever does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

SUMMARY OF THE INVENTION

One aspect of the present invention provides an improved method and system for serving IP addresses to a client, based on a selected set of performance metrics. In accordance with this invention, a global server load-balancing (GSLB) switch is provided as a proxy for an authoritative DNS server, together with one or more site switches each associated with one or more host servers. Both the GSLB switch and the site switch can be implemented using the same type of switch hardware in one embodiment. Each site switch provides the GSLB switch with current site-specific information regarding the host servers associated with the site switch. Under one aspect of the present invention, when an authoritative DNS server resolves a host name in a query and returns one or more IP addresses, the GSLB switch filters the IP addresses using the performance metrics compiled from the site-specific information collected from the site switches. The GSLB switch then returns a ranked or weighted list of IP addresses to the inquirer. In one embodiment, the IP address that is estimated to provide the best-expected performance for the client is placed at the top of the list.

Examples of suitable performance metrics include availability metrics (e.g., a server's or an application's health), load metrics (e.g., a site switch's session capacity or a corresponding preset threshold), and proximity metrics (e.g., a round-trip time between the site switch and a requesting DNS server, the geographic location of the host server, the topological distance between the host server and the client program). (A topological distance is the number of hops between the server and the client). Another proximity metrics is the site switch's "flashback" speed (i.e., how quickly a switch receives a health check result). Yet another metric is a connection-load metric that is based on a measure of new connections-per-second at a site. The ordered list can also be governed by other policies, such as the least selected host server.

The present invention is better understood upon consideration of the detailed description of the embodiments below, in conjunction with the accompanying drawings.

BRIEF DESCRIPTION OF THE DRAWINGS

FIG. 2D depicts the relative position of portions of the flow chart.

DETAILED DESCRIPTION

Embodiments for global server load-balancing are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
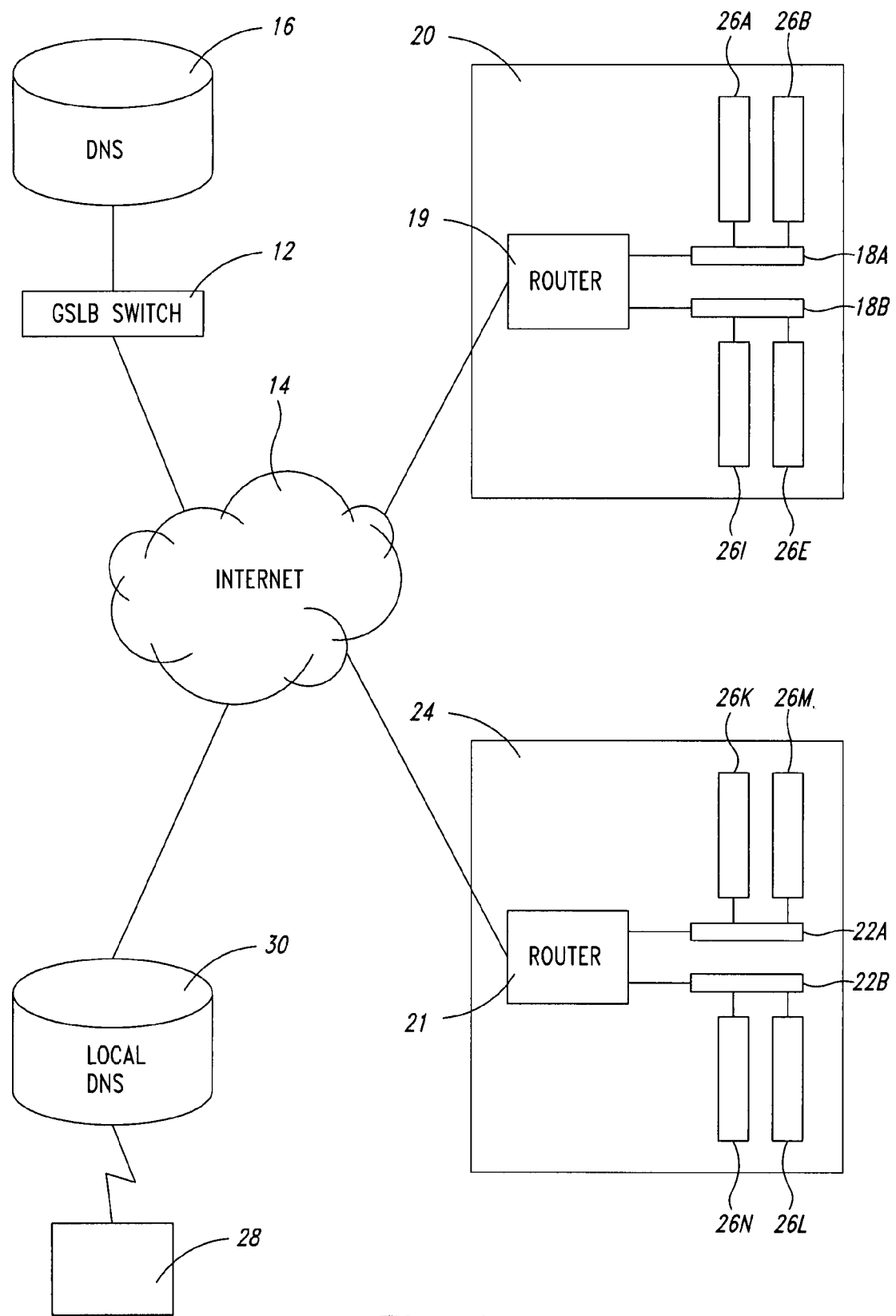
FIG. 1 illustrates a global server load-balancing configuration in accordance with one embodiment of the invention.

FIG. 1 illustrates one embodiment of the present invention that provides a global server load-balancing configuration. As shown in FIG. 1, global server load balancing (GSLB) switch 12 is connected to Internet 14 and acts as a proxy to an authoritative Domain Name System (DNS) server 16 for the domain "foundrynet.com" (for example). That is, while the actual DNS service is provided by DNS server 16, the IP address known to the rest of the Internet for the authoritative DNS sever of the domain "foundrynet.com" is a virtual IP (VIP) address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, ..., 26I, ... 26N. Some or all of servers 26A, ..., 26I, ..., 26N may host application server programs (e.g., http and ftp) relevant to the present invention. These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc.

FIG. 1 also shows client program 28 connected to Internet 14, and communicates with local DNS server 30. When a browser on client 28 requests a web page, for example, using a Universal Resource Locator (URL), such as http://www-.foundrynet.com/index.htm, a query is sent to local DNS server 30 to resolve the symbolic host name www.foundrynet.com to an IP address of a host server. The client program receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses is ordered by GSLB switch 12 based on performance metrics described in further detail below.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment, GSLB switch 12 determines which site switch would provide the best expected performance (e.g., response time) for client 28 and returns the IP address list with a virtual IP address configured at that site switch placed at the top. (Within the scope of the present invention, other forms of ranking or weighting the IP addresses in the list can also be possible.) Client program 28 can receive the ordered list of IP addresses, and typically selects the first IP address on the list to access the corresponding host server.

Figure 3:
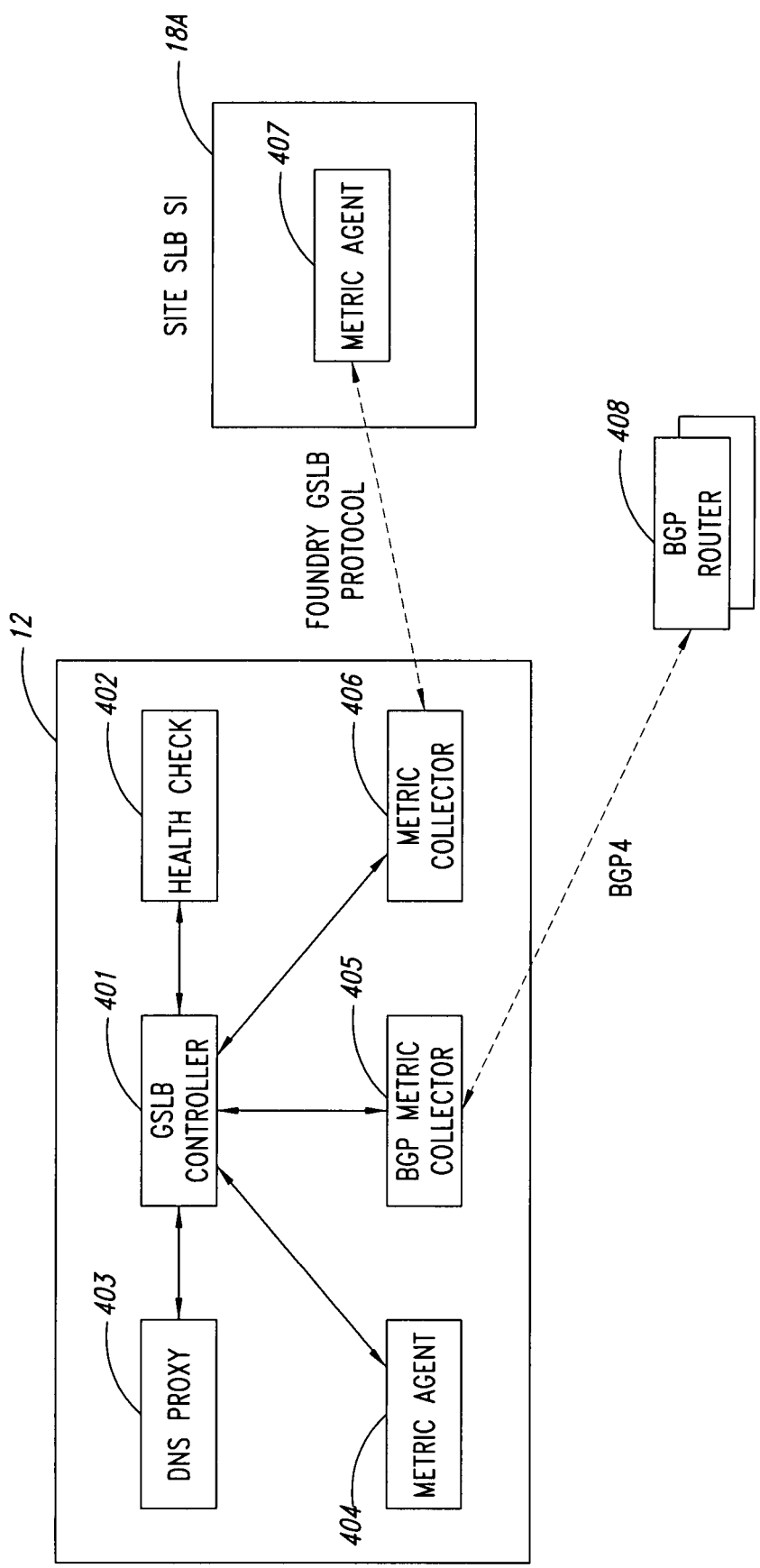
FIG. 3 is a block diagram showing the functional modules of a GSLB switch and a site switch relevant to the global server load balancing function in accordance with one embodiment of the invention.

FIG. 3 is a block diagram showing the functional modules of GSLB switch 12 and site switch 18A relevant to the global server load balancing function. As shown in FIG. 3, GSLB switch 12 includes a GSLB switch controller 401, health check module 402, DNS proxy module 403, metric agent 404, routing metric collector 405, and site-specific metric collector 406. GSLB switch controller 401 provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. Site-specific metric collector 406 communicates with metric agents in site-specific switches (e.g., FIG. 3 shows site-specific metric collector 406 communicating with site-specific metric agent 407 of a site server load balancing ServerIron or "SLB SI") to collect site-specific metrics (e.g., number of available sessions on a specific host server and/or connection-load data at that host server).

For example for a connection-load metric in one embodiment, site-specific metric agent(s) 407 can perform sampling to obtain connections-per-second at their respective site, and then obtains load averages from the samples or performs other calculations. The site-specific metric collector 406 of the GLSB switch 12 then obtains the load averages from the site-specific metric agent(s) 407 and provides these load averages to the switch controller 401, to allow the switch controller 401 to use the load averages to rank the IP addresses on the ordered list. Alternatively or in addition to the site-specific metric agent(s) 407, the switch controller 401 can perform at least some or most of the connection-load calculations from sampling data provided by the site-specific metric agent(s) 407.

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (a) receives incoming DNS requests, (b) provides the host names to be resolved to DNS server 16, (c) receives from DNS server 16 a list of responsive IP addresses, (d) orders the IP addresses on the list received from DNS server 16 according to an embodiment of the present invention, using the metrics collected by routing-metric collector 405 and site specific collector 406, and values of any other relevant parameter, and (e) provides the ordered list of IP addresses to the requesting DNS server. Since GSLB switch 12 can also act as a site switch, GSLB switch 12 is provided site-specific metric agent 404 for collecting metrics for a site-specific metric collector.

In one embodiment, the metrics used in a GSLB switch 12 includes (a) the health of each host server and selected applications, (b) each site switch's session capacity threshold, (c) the round trip time (RTT) between a site switch and a client in a previous access, (d) the geographical location of a host server, (e) the connection-load measure of new connections-per-second at a site switch, (f) the current available session capacity in each site switch, (g) the "flashback" speed between each site switch and the GSLB switch (i.e., how quickly each site switch responds to a health check from the GSLB switch), and (h) a policy called the "Least Response Selection" (LRS) which prefers the site least selected previously. Many of these performance metrics can be provided default values. Each individual metric can be used in any order and each metric can be disabled. In one embodiment, the LRS metric is always enabled.

Figure 2A:
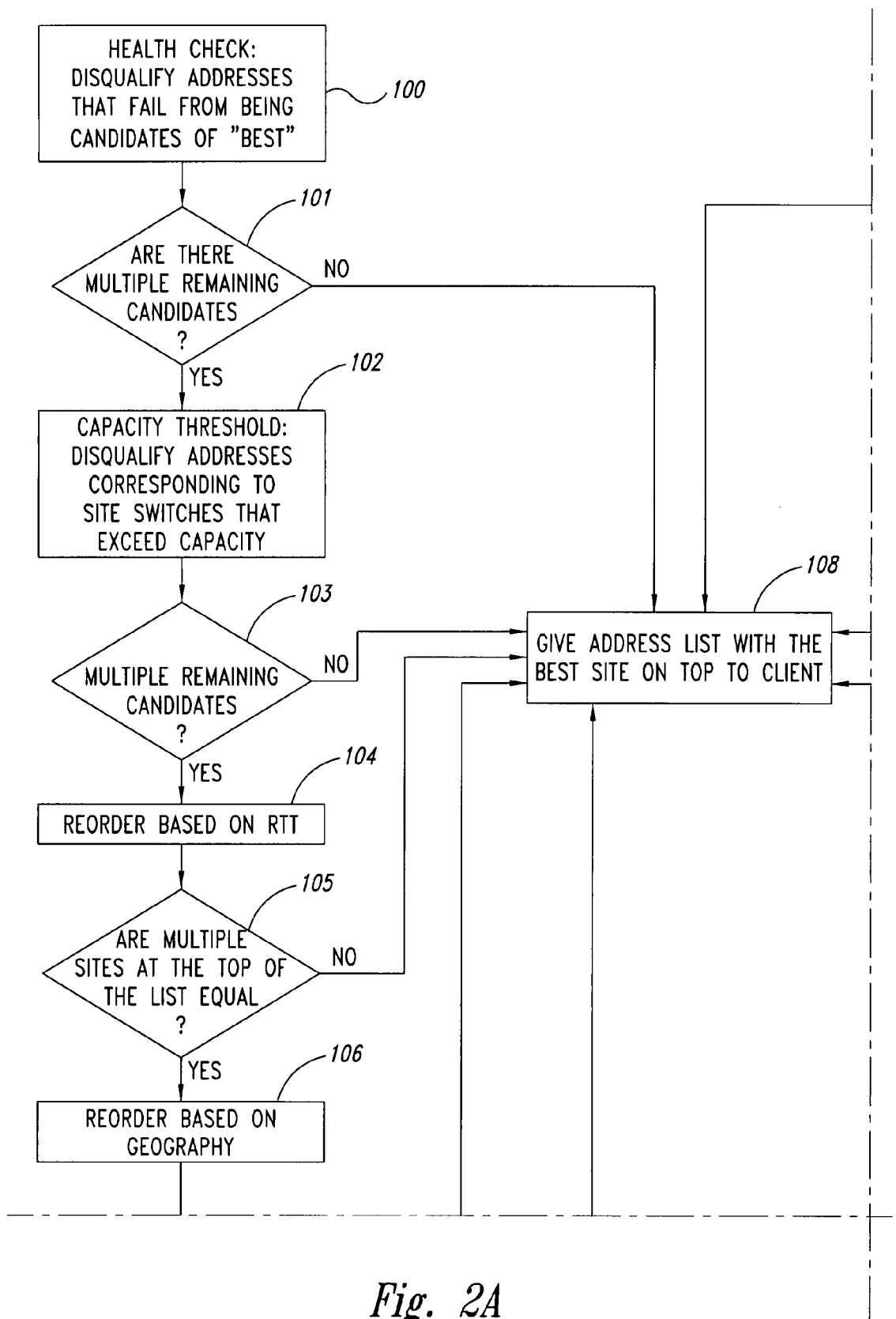
FIGS. 2A-2D illustrate in a flow chart one embodiment of an algorithm for selecting the "best" address from the list of addresses supplied by an authoritative DNS, where
Figure 2B:
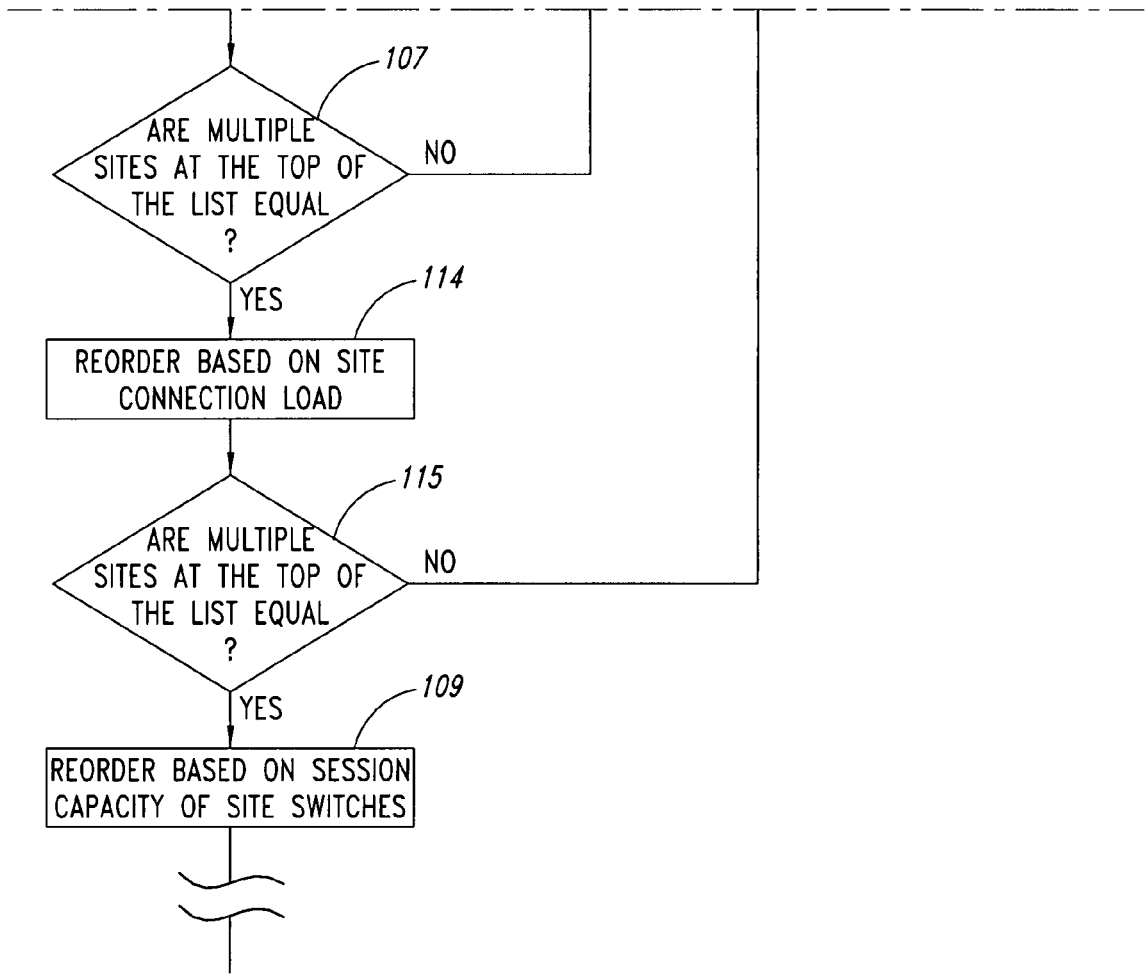
Figure 2C:
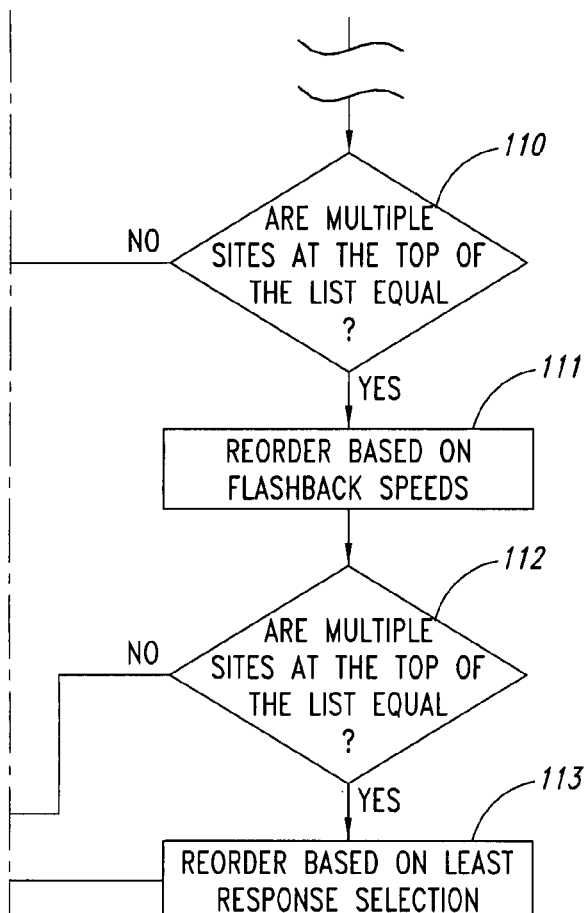
Figure 2D:
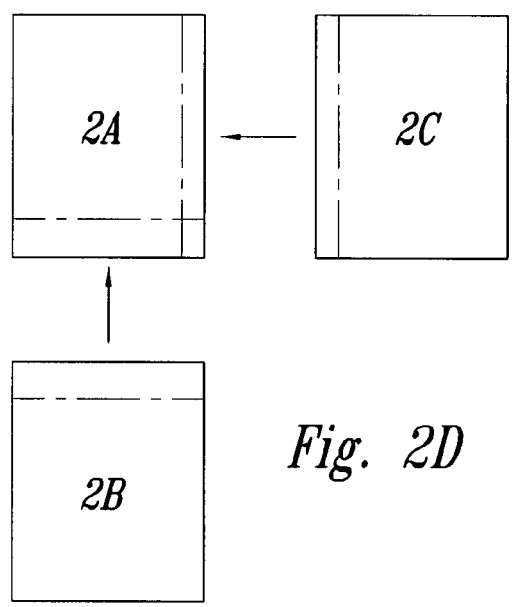

FIGS. 2A-2D illustrate in a flow diagram one embodiment of an optimization algorithm utilized by GSLB switch 12 to process the IP address list received from DNS server 16, in response to a query resulting from client program 28, where FIG. 2D shows the relative position of portions of the flow diagram shown in FIGS. 2A-2C. At least some of the elements of the flow diagram can be embodied in software or other machine-readable instruction stored on one or more machine-readable storage media. For example, such software to perform portions of the algorithm may be present at the GSLB switch 12 in one embodiment and executed by the switch controller 401.

As shown in FIG. 2A, in act 100, upon receiving the IP address list from DNS server 16, GSLB switch 12 performs, for each IP address on the IP address list (e.g., host server 261 connected to site switch 18B), a layer 4 health check and a layer 7 check. Here, layers 4 and 7 refer respectively to the transport and application protocols in the Open System Interconnection (OSI) protocol layers. The layer 4 health check can be a Transmission Control Protocol (TCP) health check or a User Datagram Protocol (UDP) health check. Such a health check can be achieved, for example, by a "ping-like" operation defined under the relevant protocol. For example, under the TCP protocol, a TCP SYN packet can be sent, and the health of the target is established when a corresponding TCP ACK packet is received back from the target. In this embodiment, the layer 7 health check is provided for specified applications, such as the well-known HyperText Transport Protocol (HTTP) and the File Transfer Protocol (FTP) applications. If a host server or an associated application fails any of the health checks it is disqualified (act 100) from being the "best" site and may be excluded from the IP address list to be returned to client program 28. Since the health check indicates whether or not a host server or an associated application is available, the health check metric is suitable for use to eliminate an IP address from the candidates for the "best" IP address (i.e., the host server expected to provide the highest performance). After act 100, if the list of IP addresses has only one IP address (act 101), the list of IP addresses is returned to client program 28 at act 108.

After act 100, if the list of candidate IP addresses for the best site has multiple IP addresses, it is further assessed in act 102 based upon the capacity threshold of the site switch serving that IP address. Each site switch may have a different maximum number of TCP sessions it can serve. For example, the default number for the "ServerIron" product of Foundry Network is one million sessions, although it can be configured to a lower number. The virtual IP address configured at site switch 18B may be disqualified from being the "best" IP address if the number of sessions for switch 18B exceed a predetermined threshold percentage (e.g., 90%) of the maximum number of sessions. (Of course, the threshold value of 90% of the maximum capacity can be changed.) After act 102, if the list of IP addresses has only one IP address (act 103), the list of IP addresses is returned to client program 28 at act 108.

After act 102, if the IP address list has multiple IP addresses (act 103), the remaining IP addresses on the list can then be reordered in act 104 based upon a round-trip time (RTT) between the site switch for the IP address (e.g., site switch 18B) and the client (e.g., client 28). The RTT is computed for the interval between the time when a client machine requests a TCP connection to a proxy server configured on a site switch, sending the proxy server a TCP SYN packet, and the time a site switch receives from the client program a TCP ACK packet. (In response to the TCP SYN packet, a host server sends a TCP SYN ACK packet, to indicate acceptance of a TCP connection; the client machine returns a TCP ACK packet to complete the setting up of the TCP connection.) The GSLB switch (e.g., GSLB switch 12) maintains a database of RTT, which it creates and updates from data received periodically from the site switches (e.g., site switches 18A, 18B, 22A and 22B). Each site collects and stores RTT data for each TCP connection established with a client machine. In one embodiment, the GSLB switch favors one host server over another only if the difference in their RTTs with a client machine is greater than a specified percentage, the default specified percentage value being 10%, for example. To prevent bias, the GSLB switch ignores, by default, RTT values for 5% of client queries from each responding network, for example. After act 105, if the top entries on the list of IP addresses do not have equal RTTs, the list of IP addresses is returned to client program 28 at act 108.

If multiple sites have equal RTTs (act 105), then the list is reordered in act 106 based upon the location (geography) of the host server. The geographic location of a server is determined according to whether the IP address is a real address or a virtual IP address ("VIP"). For a real IP address, the geographical region for the host server can be determined from the IP address itself. Under IANA, regional registries RIPE (Europe), APNIC (Asia/Pacific Rim) and ARIN (the Americas and Africa) are each assigned different prefix blocks. In one embodiment, an IP address administered by one of these regional registries is assumed to correspond to a machine located inside the geographical area administered by the regional registry. For a VIP, the geographic region is determined from the management IP address of the corresponding site switch. Of course, a geographical region can be prescribed for any IP address to override the geographic region determined from the procedure above. The GSLB switch prefers an IP address that is in the same geographical region as the client machine in an embodiment. At act 107, if the top two entries on the IP list are not equally ranked, the IP list is sent to the client program 28 at act 108.

After act 107, if multiple sites are of equal rank for the best site, the IP addresses can then be reordered based upon site connection load (act 114). The connection-load metric feature allows comparison of sites based on the connection-load on their respective agent (e.g., at the metric agent 407 of the site ServerIron switch 18A in FIG. 3, for instance).

The connection-load is a measure of new connections-per-second on the agent 407 in one embodiment. An administrator can set a threshold limit for the connection-load to pass a given site; can select the number of load sampling intervals and duration of each interval; and can select the relative weight for each interval to calculate the average load for a period of time (i.e., new connections per the period of time).

The "connection load limit" value specifies the load limit for any site to pass the metric. The minimum value is 1, and a parser or other software component in the site switch 18A, for instance, limits the maximum value—there need not be a default value. By default, this connection-load metric is turned off and can be turned on when the load limit is specified. The average load for a given site is calculated using the user-defined weights and intervals, which will be explained later below. If the calculated average load is less than the load limit specified, the site is passed on to the next stage of the GSLB algorithm described herein—otherwise that site is eliminated/rejected from the set of potential candidates.

In one embodiment, the number of "load sampling intervals" and also the "sampling rate" can be configured. The sampling rate defines the duration of each sampling interval in multiples of the initial rate. For example, if 6 sampling intervals and a sampling rate of 5 seconds are chosen, the site will sample the average load at 5, 10, 15, 20, 25, and 30. At any instant, the site will have the average load for the previous 5 seconds, 10 seconds, 15 seconds, 20 seconds, 25 seconds, and 30 seconds. This is a "moving average" in that at the 35th second, for example, the average for the 5th to 35th seconds is calculated. Note that even though this is a moving average, the accuracy is limited by the initial sampling rate, meaning that since samples are taken after every 5 seconds, at the 7th second, the average for the 1 st to 5th second is available and not the 2nd to 7th second average.

The sampling rate also defines the update interval for the site (e.g., the site-specific metric agent 407) to upload the load averages to the metric collector 406 at the GSLB switch 12. A given site is capable of maintaining load-averages for any number of collectors at a time. Each collector is updated with the load information periodically, and the update interval is also specific to the collector in various example embodiments.

The minimum number of intervals is 1 and the max is 8 in one embodiment. The default number is 5, which is set when the connection load limit is configured. It is appreciated that these are merely illustrative examples and may be different based on the particular implementation.

For the load-sampling interval, the minimum value is 1 second and maximum value is 60 seconds. The default value is 5 seconds. So, the maximum range for load average calculation is 60*8 seconds=480 seconds=8 minutes. Thus, one can consider up to the previous 8-minute average for load analysis. Again, these are example settings.

Weights can be assigned to each interval to calculate the average load. By default in one embodiment, each interval is given an equal weight of 1. The average load for a site can be calculated using the following formula:

$$\frac{\sum_{i=0}^{N}(AvgLoad \text{ of interval } i) * (\text{Weight of interval } i)}{\sum_{i=0}^{N}(\text{Weight of interval } i)}$$

where N=Number of sampling intervals and AvgLoad of interval i=new connections of interval i.

The contribution of any interval can be nullified by giving it a weight of zero. If every interval is given a weight of zero, the average load is zero. (We cannot divide by zero). In one embodiment, the site-specific metric agent 407 can calculate this average load and provide it to the metric collector 406 at the GSLB switch 12. In other embodiments, the metric collector 406 and/or the switch controller 401 can perform the average load calculation based on values collected and provided by the site-specific metric agent 407.

By default, the connection-load metric is not turned on in the GSLB algorithm. The metric is automatically turned on when the user specifies the connection-load limit, in an embodiment. The specific configuration needs for connection-load sampling and calculation can be configured on the switch controller 401, whether the switch 12 is used for GSLB or as a site-specific switch.

To configure the connection load limit (such as a connection load limit of 500), at the GSLB policy configuration level, the following example command can be used:

SW-GSLB-Controller (config-gslb-policy) #connection-load limit 500

Again, as described above, if the calculated average load is less than this limit, then the site is kept as a potential candidate.

To configure the number of sampling intervals and the sampling rate (e.g., sampling rate=5, interval=6), the following example command may be used:

SW-GSLB-Controller (config-gslb-policy) #connection-load intervals 6 5.

To configure the interval weights, the following example command can be used:

SW-GSLB-Controller (config-gslb-policy) #connection-load weights 1 2 3 4 5 6

The syntax of this command is: connection-load weights<weight of interval-1><weight of interval-2><weight of interval-3> . . . up to 8, for example.

All weights for all intervals need not be configured if not considering beyond a certain point. The configured weights will be assigned to intervals starting from the first and any non-configured interval will be assigned a weight of zero. For example, if only the 5-second average is desired, the following can be used:

SW-GSLB-Controller (config-gslb-policy) #connection-load intervals 6 5

SW-GSLB-Controller (config-gslb-policy) #connection-load weights 1

Thus, even though 6 intervals are configured in the above example, all the others are nullified due to zero weights.

By default the connection-load metric is not included in the GSLB algorithm. Once the connection-load limit is configured, the metric is included after the geographic-location metric in the metric order according to one embodiment, such as shown in FIG. 2B. It is understood that the metric order can be changed or customized.

At act 115, if there are no multiple candidates at the top of the IP list that have passed the connection-load metric (or there are none of equal rank), then the IP address list is sent to the client program 28 at act 108. After act 115, if multiple sites are of equal rank for the best site, the IP addresses can then be reordered based upon available session capacity (act 109). For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. For example, if the tolerance limit is 10%, switch 18A will have to have at a minimum 100,000 more sessions available than switch 22B to be preferred. If an IP address is preferred (act 110), the IP address will be placed at the top of the IP address list, and is then returned to the requesting entity at act 108. Otherwise, if the session capacity does not resolve the best IP address, act 111 then attempts to a resolution based upon a "flashback" speed. The flashback speed is a time required for a site switch to respond to layers 4 and 7 health checks by the GSLB switch. The flashback speed is thus a measure of the load on the host server. Again, the preferred IP address will correspond to a flashback speed exceeding the next one by a preset tolerance limit.

In one embodiment, flashback speeds are measured for well-known applications (layer 7) and their corresponding TCP ports (layer 4). For other applications, flashback speeds are measured for user selected TCP ports. Layer 7 (application-level) flashback speeds are compared first, if applicable. If the application flashbacks fail to provide a best IP address, layer 4 flashback speeds are compared. If a host server is associated with multiple applications, the GSLB switch selects the slowest response time among the applications for the comparison. At act 112, if a best IP address is resolved, the IP address list is sent to client program 28 at act 108. Otherwise, at act 113, an IP address in the site that is least often selected to be the "best" site is chosen. The IP address list is then sent to client program 28 (act 108).

Upon receipt of the IP address list, the client program 28 uses the best IP address selected (i.e., the top of the list) to establish a TCP connection with a host server. Even then, if there is a sudden traffic surge that causes a host server to be overloaded, or if the host servers or the applications at the site become unavailable in the mean time, the site switch can redirect the TCP connection request to another IP address using, for example, an existing HTTP redirection procedure.

To provide an RTT under an embodiment of the present invention described above, at the first time a client accesses an IP address, a site switch (e.g., site switch 22A of FIG. 2) monitors the RTT time—the time difference between receiving a TCP SYN and a TCP ACK for the TCP connection—and records it in an entry of the cache database. The RTT time measured this way corresponds to the natural traffic flow between the client machine and the host server specified, rather than an artificial RTT based on "pinging" the client machine under a standard network protocol. Periodically, the site switches report the RTT database to a GSLB switch along with load conditions (e.g., number of sessions available). The GSLB switch aggregates the RTTs reported into a proximity table indexed by network neighborhood. (A network neighborhood is the portion of a network sharing a prefix of an IP address.) The GSLB switch can thus look up the RTT for a client machine to any specific host server, based on the client's network neighborhood specified in the client's IP address. From the accesses to the host servers from a large number of network neighborhoods, the GSLB switch can build a comprehensive proximity knowledge database that enables smarter site selection. In order to keep the proximity table useful and up-to-date, the GSLB switch manages the proximity table with cache management policies (e.g., purging infrequently used entries in favor of recently obtained RTTs). The proximity data can be used for all IP addresses served by each site switch.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a load balance switch that includes:
switch hardware; and
a controller adapted to calculate an average load of new connections to each respective site switch of a plurality of site switches, and to rank virtual IP addresses of the site switches based on the calculated average load of new connections to each said site switch,
wherein a number of said new connections is determined at least in part using a weighted sampling interval of a plurality of sampling intervals,
wherein at least one sampling interval of the plurality of sampling intervals is configurable with a weight of one and at least another sampling interval of the plurality of sampling intervals is configurable with a non-zero weight other than one.

2. The apparatus of claim 1 wherein said number of said new connections is determined using a sampling rate and said weighted sampling interval.

3. The apparatus of claim 2 wherein said load balance switch is configurable with its own at least one virtual IP address, and said load balance switch further includes:
a metric agent to sample a number of new connections to the load balance switch for the at least one virtual IP address configured on the load balance switch, using a sampling rate and a sampling interval, and to provide information resulting from the sampling to the controller, wherein the controller is adapted to calculate an average load of new connections to the load balance switch based on the provided information resulting from the sampling, and
wherein the controller is adapted to perform said ranking of the virtual IP addresses based also on the calculated average load of new connections to the load balance switch.

4. The apparatus of claim 1 wherein the controller is adapted to rank the virtual IP addresses by accepting a virtual IP address of any of said site switches that has a calculated average load of new connections less than a connection load limit and by rejecting a virtual IP address of any of said site switches that has a calculated average load of new connections greater than the connection load limit.

5. The apparatus of claim 1 wherein said controller is adapted to rank said virtual IP addresses based on a plurality of performance metrics.

6. The apparatus of claim 1 wherein still another sampling interval of the plurality of sampling intervals is configurable with a weight of 0 to nullify a contribution of said still another sampling interval.

7. An apparatus, comprising:
a load balance switch that includes:
switch hardware; and
a controller adapted to rank respective virtual IP addresses of respective site switches based on a calculated average load of new connections to each of said site switches,
wherein a number of said new connections is determined at least in part using a sampling interval that is configurable with a weight and that is included amongst a plurality of sampling intervals,
wherein intervals of said plurality of sampling intervals are configurable with non-zero weights that are different from each other.

8. The apparatus of claim 7 wherein the average load of new connections is calculated by the respective site switch using a sampling rate and said sampling interval that is configurable with the weight.

9. The apparatus of claim 7 wherein the controller is adapted to calculate the average load of new connections for the respective site switch using said number of new connections, which is received from the respective site switch.

10. The apparatus of claim 7 wherein the controller is adapted to rank the virtual IP addresses by accepting a virtual IP address of any of said site switches that has a calculated average load of new connections less than a connection load limit and by rejecting a virtual IP address of any of said site switches that has a calculated average load of new connections greater than the connection load limit.

11. The apparatus of claim 7 wherein said controller is adapted to rank said virtual IP addresses based on a plurality of performance metrics.

12. The apparatus of claim 7 wherein at least another sampling interval of the plurality of sampling intervals is configurable with a weight of 0 to nullify a contribution of said still another sampling interval.

13. The apparatus of claim 7 wherein said at least two sampling intervals of said plurality of sampling intervals that are configurable with non-zero weights that are different from each other include:
a first sampling interval configurable with a weight of one; and
a second sampling interval configurable with a non-zero weight other than one.

14. An apparatus, comprising:
a load balance switch that includes:
switch hardware;
a DNS proxy module adapted to receive a list of virtual IP addresses; and
a controller coupled to the DNS proxy module and adapted to arrange the received list of virtual IP addresses based on a calculated average load of new connections to each of said virtual IP addresses,
wherein a number of said new connections is determined at least in part using a sampling interval that is configurable with a weight and that is included amongst a plurality of sampling intervals,
wherein at least two sampling intervals of said plurality of sampling intervals are configurable with non-zero weights that are different from each other.

15. The apparatus of claim 14 wherein the load balance switch is also is configured with its own at least one virtual IP address, and said load balance switch further includes:
a metric agent adapted to sample new connections to the load balance switch for the at least one virtual IP address using a sampling rate and a sampling interval so as to obtain a number of new connections to the at least one virtual IP address, and to provide the obtained number of new connections to the controller for calculation of an average load of new connections to the at least one virtual IP address.

16. The apparatus of claim 14 wherein the controller is adapted to receive the calculated average load of new connections from each respective site switch of a plurality of site switches.

17. The apparatus of claim 15 wherein the calculated average load of new connections is calculated from said number of new connections as sampled using a sampling rate and said sampling interval that is configurable with the weight.

18. The apparatus of claim 14 wherein said controller is adapted to arrange said virtual IP addresses based on a plurality of performance metrics.

19. The apparatus of claim 14 wherein still another sampling interval of the plurality of sampling intervals is configurable with a weight of 0 to nullify a contribution of said still another sampling interval.

20. The apparatus of claim 14 wherein said at least two sampling intervals of said plurality of sampling intervals that are configurable with non-zero weights that are different from each other include:
a first sampling interval configurable with a weight of one; and
a second sampling interval configurable with a non-zero weight other than one.

21. An apparatus, comprising:
a load balance switch to receive a list of virtual IP addresses and that includes:
switch hardware; and
controller means for ranking the virtual IP addresses in the received list based on a calculated average load of new connections to each of said virtual IP addresses,
wherein a number of said new connections is determined at least in part using a sampling interval that is configurable with a weight and that is included amongst a plurality of sampling intervals,
wherein at least two sampling intervals of said plurality of sampling intervals are configurable with non-zero weights that are different from each other.

22. The apparatus of claim 21, wherein:
at least one virtual IP address is configurable on the load balance switch; and
said controller means for ranking ranks said virtual IP addresses based on a plurality of performance metrics.

23. The apparatus of claim 21 wherein the calculated average load of new connections is received from each respective site switch of a plurality of site switches.

24. The apparatus of claim 21 wherein the controller means for ranking calculates the average load of new connections from said number of new connections as sampled using a sampling rate and said sampling interval that is configurable with the weight.

25. The apparatus of claim 21 wherein still another sampling interval of the plurality of sampling intervals is configurable with a weight of 0 to nullify a contribution of said still another sampling interval.

26. The apparatus of claim 21 wherein said at least two sampling intervals of said plurality of sampling intervals that are configurable with non-zero weights that are different from each other include:
a first sampling interval configurable with a weight of one; and
a second sampling interval configurable with a non-zero weight other than one.

27. A method, comprising:
receiving, by a load balance switch having switch hardware, a list of virtual IP addresses; and
ranking, by said load balance switch, the virtual IP addresses in the received list based on a calculated average load of new connections to each of said virtual IP addresses,
wherein a number of said new connections is determined at least in part using a sampling interval that is configurable with a weight and that is included amongst a plurality of sampling intervals, wherein at least two sampling intervals of said plurality of sampling intervals are configurable with non-zero weights that are different from each other.

28. The method of claim 27 wherein:

at least one virtual IP address is configurable on the load balance switch; and new connections to the at least one virtual IP address on the load balance switch is obtained using a sampling rate and a sampling interval.

29. The method of claim 27 wherein the calculated average load of new connections is received by said load balance switch from each respective site switch of a plurality of site switches.

30. The method of claim 27, further comprising calculating, by said load balance switch, the average load of new connections from said number of new connections as sampled using a sampling rate and said sampling interval that is configurable with the weight.

31. The method of claim 27 wherein said at least two sampling intervals of said plurality of sampling intervals that are configurable with non-zero weights that are different from each other include:

a first sampling interval configurable with a weight of one; and a second sampling interval configurable with a non-zero weight other than one.

32. A system, comprising:

a plurality of site switches, each site switch being respectively configured with a virtual IP address; and a load balance switch configured to balance load, amongst the plurality of site switches, according to a set of performance metrics so as to select a preferred virtual IP address configured at one of the site switches, wherein the set of performance metrics includes a metric based on a calculated average load of new connections to each of the plurality of site switches, wherein a number of said new connections is determined at least in part using a weighted sampling interval of a plurality of sampling intervals, wherein at least one sampling interval of the plurality of sampling intervals is configurable with a weight of one and at least another sampling interval of the plurality of sampling intervals is configurable with a non-zero weight other than one.

33. The system of claim 32, further comprising an authoritative domain name server coupled to the load balance switch, wherein the load balance switch is further configured to be a proxy to said authoritative domain name server, and wherein the load balance switch is configured to said balance load by use of said set of performance metrics to arrange virtual IP addresses in a list received from the authoritative domain name server.

* * * * *